US008838772B2

(12) United States Patent
Beeson et al.

(10) Patent No.: US 8,838,772 B2
(45) Date of Patent: Sep. 16, 2014

(54) SYSTEM AND METHOD FOR ANALYZING THE PERFORMANCE OF MULTIPLE TRANSPORTATION STREAMS OF STREAMING MEDIA IN PACKET-BASED NETWORKS

(75) Inventors: Jesse D. Beeson, Franklin, MA (US); Peter S. Dawson, Canton, MA (US); Richard T. Holleran, Attleboro, MA (US); Marc A. C. Todd, Foxboro, MA (US); James T. Welch, Mashpee, MA (US)

(73) Assignee: Ineoquest Technologies, Inc., Mansfield, MA (US)

( * ) Notice: Subject to any disclaimer, the term of this patent is extended or adjusted under 35 U.S.C. 154(b) by 912 days.

(21) Appl. No.: 11/396,753

(22) Filed: Apr. 3, 2006

(65) Prior Publication Data

US 2006/0184670 A1 Aug. 17, 2006

Related U.S. Application Data

(63) Continuation-in-part of application No. 10/604,997, filed on Aug. 29, 2003, now Pat. No. 7,321,565, and a continuation-in-part of application No. 11/257,183, filed on Oct. 24, 2005.

(60) Provisional application No. 60/621,824, filed on Oct. 25, 2004.

(51) Int. Cl.
*G06F 15/173* (2006.01)

(52) U.S. Cl.
USPC ........... 709/224; 709/223; 709/225; 709/226; 709/227

(58) Field of Classification Search
USPC .......................................... 709/224; 370/352
See application file for complete search history.

(56) References Cited

U.S. PATENT DOCUMENTS

| 5,138,615 | A | | 8/1992 | Lamport et al. |
| 5,835,500 | A | | 11/1998 | Schiller |
| 5,983,278 | A | * | 11/1999 | Chong et al. .................. 709/235 |
| 6,412,004 | B1 | * | 6/2002 | Chen et al. .................... 709/226 |

(Continued)

OTHER PUBLICATIONS http://csweb.cs.wfu.edu/~fulp/Papers/spie09f.pdf    "High-Speed Packet Filtering Utilizing Stream Processors"—Oct. 2003 Hummel et al, Wake Forest University.*

(Continued)

*Primary Examiner* — Randy Scott
(74) *Attorney, Agent, or Firm* — Brian J. Colandreo; Jeffrey T. Placker; Holland & Knight LLP

(57) ABSTRACT

Streaming media network parameters are measured using an electronic system and displayed directly to a user or transmitted via an electronic interface such as an existing system network conduit, either in or out-of-band. A scalable hardware and/or software compute engine filters and reduces network parameters to simplify tracking the instantaneous and long term streaming media performance of the network. Hence, the entire set of active media streams is continuously monitored concurrently, thereby providing the ability to detect impairments as well as predict impending impairments. In one example, an existing packetized network conduit containing streaming media is tapped to concurrently and objectively analyze the streaming media streams, producing statistics (such as delay factor and media loss rate) and alarm-type events according to predetermined rules. Tapping the existing packetized network in multiple points provides comparison points and assists in pinpointing the source(s) of the impairment(s).

46 Claims, 7 Drawing Sheets

(56) References Cited

U.S. PATENT DOCUMENTS

| | | | |
|---|---|---|---|
| 6,421,350 B1 | 7/2002 | Szurkowski et al. | |
| 6,480,977 B1 | 11/2002 | Apisdorf et al. | |
| 6,609,226 B1 | 8/2003 | Figueira | |
| 6,728,213 B1 | 4/2004 | Tzeng et al. | |
| 6,738,813 B1 | 5/2004 | Reichman | |
| 6,765,904 B1* | 7/2004 | Anandakumar et al. | 370/389 |
| 6,803,964 B1 | 10/2004 | Post et al. | |
| 6,807,156 B1 | 10/2004 | Veres et al. | |
| 6,928,055 B2 | 8/2005 | Ni | |
| 7,099,281 B1 | 8/2006 | Conway | |
| 7,203,869 B2 | 4/2007 | Gwak | |
| 7,242,681 B1* | 7/2007 | Van Bokkelen et al. | 370/389 |
| 7,313,593 B1 | 12/2007 | Pulito et al. | |
| 7,321,565 B2 | 1/2008 | Todd et al. | |
| 7,376,132 B2 | 5/2008 | Conway | |
| 7,543,051 B2* | 6/2009 | Greifeneder et al. | 709/224 |
| 7,945,688 B1* | 5/2011 | Lango et al. | 709/231 |
| 8,031,623 B2 | 10/2011 | Beeson et al. | |
| 2002/0016839 A1* | 2/2002 | Smith et al. | 709/224 |
| 2002/0136203 A1* | 9/2002 | Liva et al. | 370/352 |
| 2002/0144263 A1* | 10/2002 | Eldering et al. | 725/34 |
| 2003/0007568 A1* | 1/2003 | Hamery et al. | 375/240.26 |
| 2003/0009589 A1* | 1/2003 | Apostolopoulos et al. | 709/239 |
| 2003/0033403 A1 | 2/2003 | Rhodes | |
| 2003/0043755 A1* | 3/2003 | Mitchell | 370/252 |
| 2003/0046403 A1* | 3/2003 | Schmidt | 709/228 |
| 2003/0221013 A1* | 11/2003 | Lockwood et al. | 709/231 |
| 2004/0032916 A1 | 2/2004 | Takashima | |
| 2004/0117427 A1 | 6/2004 | Allen et al. | |
| 2004/0136327 A1 | 7/2004 | Sitaraman et al. | |
| 2004/0240447 A1* | 12/2004 | Dorbolo et al. | 370/392 |
| 2005/0071876 A1* | 3/2005 | van Beek | 725/62 |
| 2005/0080900 A1 | 4/2005 | Culbertson et al. | |
| 2006/0005099 A1 | 1/2006 | Strasman et al. | |
| 2006/0029067 A1 | 2/2006 | Conway | |
| 2006/0085553 A1 | 4/2006 | Rachwalski et al. | |
| 2006/0136578 A1* | 6/2006 | Covell et al. | 709/223 |
| 2006/0140116 A1* | 6/2006 | Alicherry et al. | 370/230 |
| 2008/0052404 A1 | 2/2008 | Leighton et al. | |
| 2009/0097413 A1 | 4/2009 | Todd et al. | |
| 2012/0014254 A1 | 1/2012 | Todd et al. | |

OTHER PUBLICATIONS http://www.isi.edu/~youngcho/pub/fccm05.pdf "Fast Reconfiguring Deep Packet Filter for 1+ Gigabit Network"—Cho et al, Univ. of California Sep. 2003.*

Hartanto, et al., "Cumulative Inter-ADU Jitter Concept and Its Applications", 2001, pp. 531-534, Dept. of Information Engineering, The Chinese University of Hong Kong, Shatin, NT, Hong Kong; Dept. of Electrical and Electronic Engineering, University of Canterbury, Christchurch, New Zealand.

* cited by examiner

SYSTEM AND METHOD FOR ANALYZING THE PERFORMANCE OF MULTIPLE TRANSPORTATION STREAMS OF STREAMING MEDIA IN PACKET-BASED NETWORKS

RELATED APPLICATION

This application is a Continuation-In-Part of U.S. patent application Ser. No. 10/604,997, entitled System and Method for Analyzing the Performance of Multiple Transportation Streams of Streaming Media in Packet-Based Networks, filed on Aug. 29, 2003 now U.S. Pat. No. 7,321,565; and is a Continuation-In-Part of U.S. patent application Ser. No. 11/257,183, entitled System and Method for Creating Multiple Transportation Streams of Streaming Media Network Test Traffic in Packet-Based Networks, filed on Oct. 24, 2005, which claims the benefit of U.S. Provisional Application Ser. No. 60/621,824, filed on Oct. 25, 2004, entitled System and Method for Creating Multiple Transportation Streams of Streaming Media Network Test Traffic in Packet-Based Networks.

BACKGROUND

1. Technical Field

The present invention relates generally to the field of streaming. More specifically, the present invention is related to analyzing streaming data in packetized form.

2. Background Information

Many electronic networks such as local area networks (LANs), metropolitan area networks (MANs), and wide area networks (WANs) are increasingly being used to transport streaming media whose real-time data transport requirements exhibit high sensitivity to data loss and delivery time distortion. The technical literature is replete with various schemes to implement Quality of Service (QOS) on such networks to address the requirements of streaming media, especially when intermixed with conventional, time-insensitive, guaranteed delivery protocol stack data traffic. Furthermore, for efficiency reasons, the streaming media transport often uses a non-guaranteed delivery upper layer protocol stack such as UDP/IP making recovery of data in the presence of packet loss difficult. Regardless of whether QOS-enabled or non-QOS-enabled networks are employed, it is necessary to monitor the behavior of packet loss, delivery time distortion, and other real-time parameters of the network to assure satisfactory quality streaming media delivery.

There exists a variety of defined Management Information Bases (MIBs) which include definitions for a number of network parameters such as packet loss, inter-arrival times, errors, percentage of network utilization, etc., whose purpose is to indicate to a network manager the general operating conditions of the network. Such traditional forms of monitoring network behavior cannot easily indicate the effects that network performance has on a single or a group of individual streaming media streams. Data gathering from MIBs operating across a range of network layers combined with a highly skilled and experienced practitioner would be required to simply determine the jitter imposed on a single MPEG video stream, for instance, and would only be possible by post-processing data gathered while the network was in operation. Determining the cause of a fault in a streaming media stream may be possible through such analysis but lacks the real-time indication of a network fault that is required to maintain high-quality networks such as for video or audio delivery. It also does not address the need to monitor large numbers of streams in real-time such as streams of Video-on-Demand (VoD) networks using less technically skilled operations personnel, as would be necessary to enable implementation of continuous cost-effective quality control procedures for widely deployed networks such as for VoD.

Histograms are often used in prior art schemes to present the arrival time behavior of packets on a network, but such histograms only represent the aggregate behavior of packets arriving at the measurement node due to the need to combine MIB data from a range of network layers to extract sufficient information to track a particular stream's performance. Traditional histograms define the jitter between any two packets. Streaming media requires more in-depth knowledge, such as the time variation across many packets referred to as the "network jitter growth". This network jitter growth affects the streaming media quality as experienced by the user due to intermediate buffer overflow/underflow between the media source and its destination.

Network jitter growth of a media stream due to traffic congestion can also be an indicator of an impending fault condition and can thus be used to avoid transport failures rather than simply to react to faults after they occur. Conventional post-processed MIB analysis is inadequate for these purposes as described above.

The concept of regulating stream flow in a network based on the leaky bucket paradigm describes a methodology that might be used to prevent intermediate buffer overflow and packet jitter by regulating the outflow of data based on a set of parameters configured to optimize a particular flow. This does not address the need to analyze and continuously monitor multiple streams as is required during the installation and operation of networks carrying streaming media, especially for those enterprises whose revenue is derived from the high quality delivery of streaming media, such as broadcast and cable television entities.

A common prior art scheme used to effectively monitor multiple video streams is to decode each stream's MPEG content (for the video example) and display the streams on a large group of television screens. Monitoring personnel then watch the screens looking for any anomalous indications and take appropriate corrective action. This is a highly subjective and error prone process, as there is a possibility that a transient fault might be missed. This is also a reactive process, as corrective action can only be taken after a fault has occurred. Furthermore, this is also an expensive process in terms of both equipment and personnel costs. It also provides little or no indications of the root cause of the fault, thus adding to the time required for implementing corrective action. This approach also does not easily scale to modern video delivery systems based upon emerging, cost-effective high-bandwidth, networks intended to transport thousands of independent video streams simultaneously. In addition, this approach cannot pinpoint the location of the fault. To do so, the personnel and equipment must be replicated at multiple points in the distribution network, greatly increasing the cost. For this to be effective, the personnel must monitor the same stream at exactly the same time for comparison.

Many types of network delivery impairments are transient in nature affecting a limited number of packets during a period of momentary traffic congestion, for example. Such impairments or impairment patterns can be missed using traditional monitoring personnel watching video monitors. By not recognizing possible repeating impairment patterns, faults can exist for much longer periods because after the fault has passed, there is no residual trace information available for analysis. The longer a fault persists, the worse the customer satisfaction levels, and the greater the potential for lost revenues.

Whatever the precise merits, features, and advantages of the above-mentioned prior art schemes, they fail to achieve or fulfill the purposes of the present invention.

SUMMARY

In one aspect of the present invention, a method is provided for simultaneously analyzing multiple packetized media streams in a network. The method includes receiving network traffic corresponding to a plurality of media streams at a node of the network, the network traffic including packets having destination information and a media payload, and filtering the network traffic into the plurality of media streams on a packet-by-packet basis, in accordance with the destination information. The media payload of each packet is passed to one of a plurality of hardware-implemented analyzer ports respectively associated with each destination, to build a plurality of isolated media streams substantially in parallel with one another, substantially at the rate the network traffic passes through the node. Statistics associated with each isolated stream may then be computed.

In another aspect of the invention, an article of manufacture includes a computer usable medium having computer readable program code embodied therein which simultaneously analyzes multiple packetized media streams in a network. The computer usable medium includes computer readable program code aiding in receiving network traffic corresponding to a plurality of media streams at a node of the network, the network traffic including packets having destination information and a media payload. Computer readable program code is also provided to aid in filtering the received network traffic into the plurality of media streams on a packet-by-packet basis, in accordance with the destination information. Computer readable program code aids in passing the media payload of each packet to one of a plurality of hardware-implemented analyzer ports respectively associated with each destination, to build a plurality of isolated media streams substantially in parallel with one another; and computes statistics associated with each isolated stream.

In a still further aspect of the invention, a system is provided for simultaneously analyzing multiple packetized media streams in a network at a network node. The system includes an interface configured to forward a copy of the multiple packetized media streams, the streams including packets having destination information and a media payload. A filter is configured to receive and filter the forwarded media streams on a packet by packet basis in accordance with the destination information. A plurality of hardware-implemented analyzer ports respectively associated with each destination, are configured to receive the media payload of each filtered packet to build a plurality of isolated media streams substantially in parallel with one another. A computing engine is configured to compute statistics associated with each isolated media stream.

BRIEF DESCRIPTION OF THE DRAWINGS

The above and other features and advantages of this invention will be more readily apparent from a reading of the following detailed description of various aspects of the invention taken in conjunction with the accompanying drawings, in which.

DETAILED DESCRIPTION

Figure 1:
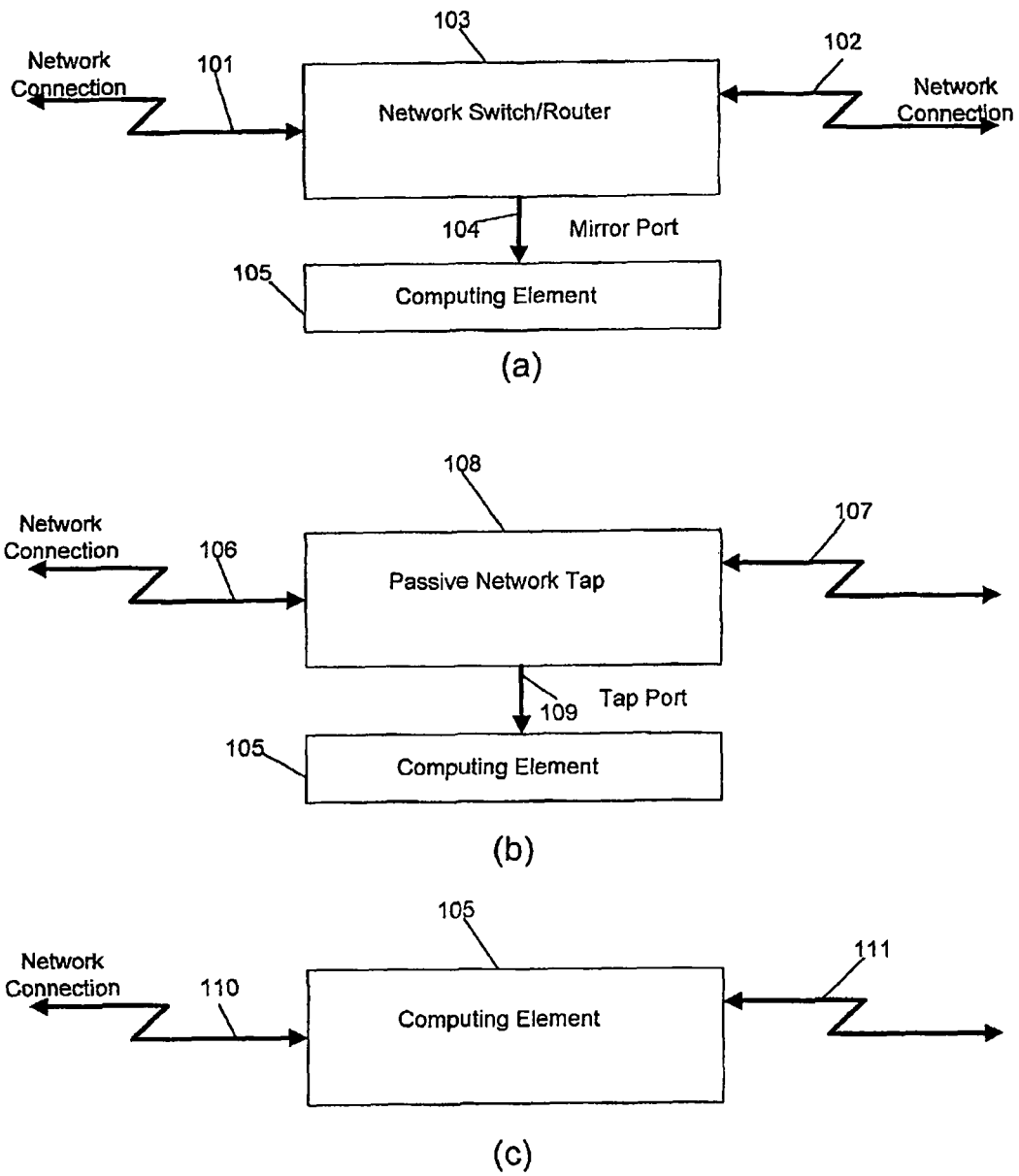
FIGS. 1A-C illustrate several methods of tapping an existing network traffic flow via the present invention's computing element.

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. The following detailed description is, therefore, not to be taken in a limiting sense, and the scope of the present invention is defined by the appended claims and their equivalents. For clarity of exposition, like features shown in the accompanying drawings shall be indicated with like reference numerals and similar features as shown in alternate embodiments in the drawings shall be indicated with similar reference numerals.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Many streaming media systems, such as VoD, broadcast television control centers, or satellite-based video distribution operations utilize packetized data networks for their low-cost and omnipresence in modern data systems. The present invention monitors these existing network conduits by sampling the data contained therein with minimal alteration of its characteristics.

FIGS. 1a-c illustrate several methods of tapping an existing network traffic flow via the present invention's computing element 105. FIG. 1a illustrates a setup wherein an ordinary network switch or router 103, which, while performing packet switching or routing on the traffic from its many ports, such as 101 and 102, also provides for a "mirror" or "monitor" port 104. Port 104 makes all data from a desired port available to the present invention's computing element 105. Alternatively, as shown in FIG. 1b, a passive network tap 108 diverts a portion of the network traffic flow energy from one network port 106 to the other network port 107 and transmits that portion via a port 109 to the present invention's computing element 105. FIG. 1c illustrates yet another method to tap the existing network flow via inserting the present invention's computing element 105 directly in-line with the network link to be observed via network ports 110 and 111.

In the examples of FIGS. 1a-b, the computing elements 105 used in each case are identical. In the example of FIG. 1c, the computing element 105 also actively forwards all traffic from network connection 110 to network connection 111 and vice versa, while simultaneously providing all traffic to the equivalent internal functionality of the computing elements designated 105.

Figure 2:
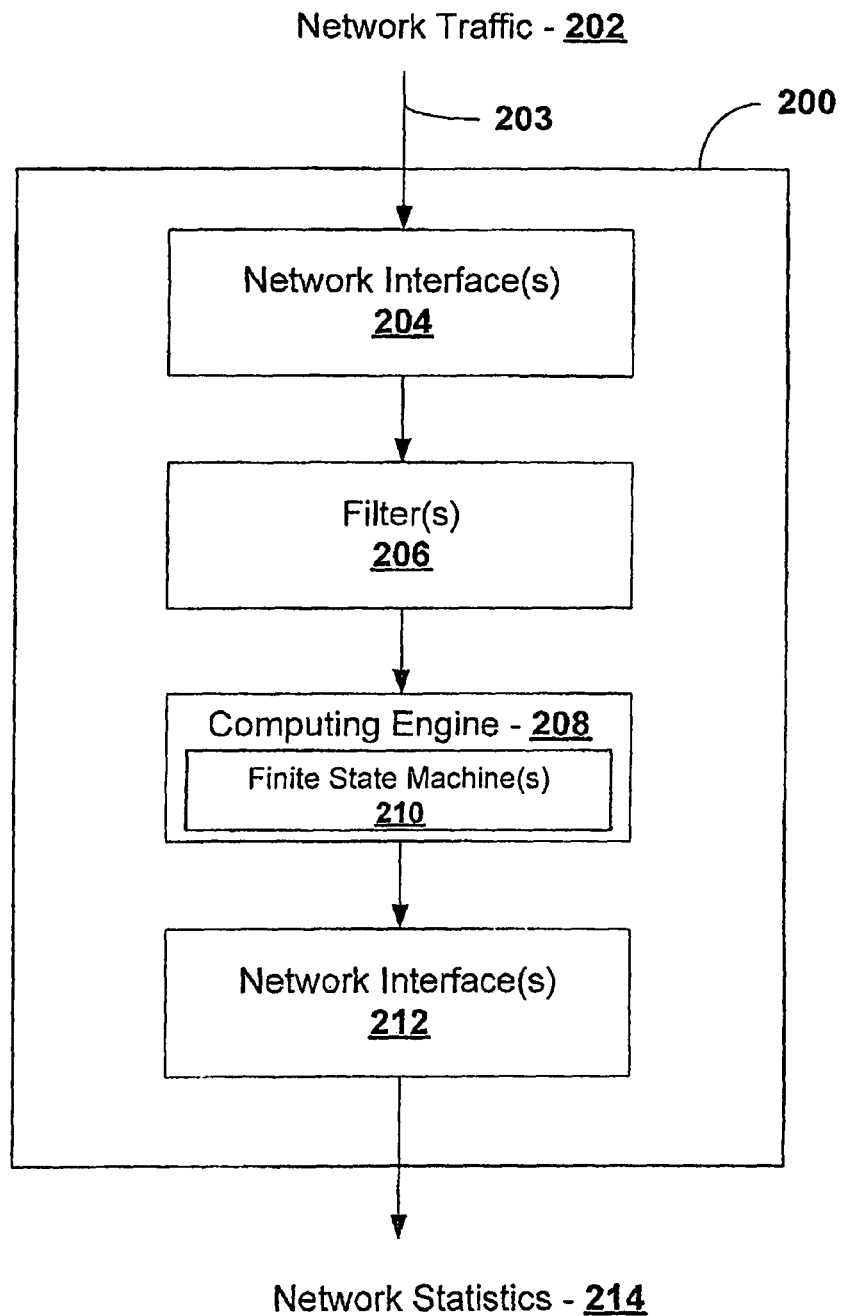
FIG. 2 illustrates one embodiment of the present invention's computing element which analyzes network traffic.

FIG. 2 illustrates one embodiment of the present invention's computing element 200 which analyzes network traffic 202. Computing element 200 comprises at least one network interface 204 to receive network traffic, one or more filters 206 to filter the received network traffic, at least one computing engine 208 to compute network statistics associated with the filtered network traffic via one or more finite state machines 210, and at least one network interface 212 to accept control instructions and transmit the computed statistics to a measurement consumer. Network interface 204 interfaces with the network link to be monitored via network connections 203. Network link protocols that support such packet-based transmission include, but are not limited to, 802.3 (Ethernet), 802.4, 802.5, USB, ATM, SONET, 802.11, Fibre-channel, Firewire or 1394, Infiniband, Bluetooth, 802.11, 802.15, 802.16, 802.17, ZigBee, or a native streaming video interface such as DVB-ASI.

The streaming media traffic of interest, which may consist of many individual streams of traffic, is filtered (via one or more filters 206) from the incoming network traffic 202 and processed by the finite state machines 210 of computing engine 208 to reduce its measured transmission characteristics to a set of statistics or critical parameters known as an "Index". The Index can be communicated to a logging system with alarm values set for convenient human monitoring. For example, warnings can be forwarded to a measurement consumer when the computed statistics exceeds a predetermined threshold or rate-of-change. It should be noted that one computing engine can be used to track several streams of interest. Similarly, one or more computing engines can be used to track several streams of interest. Hence, the number of computing engines or the number of streams to be tracked should not be used to limit the scope of the present invention.

In one preferred embodiment, the Index, known as the Media Delivery Index (MDI) consists of two parts: the Delay Factor (DF) and the Media Loss Rate (MLR). This embodiment is valuable for various types of transport streams, including, for example, constant bit rate MPEG-2 transport streams and variable bit rate streams carried over a network such as a packetized network. The DF represents the Instantaneous Flow Rate Balance (IFRB) and is derived in the computing element. The MLR represents the number of lost or corrupted media packets and is readily derived from tracking the Continuity Counter (CC) for the MPEG-2 transport stream application or from a sequence counter or the like for protocols, such as RTP, which support the same. The MDI (DF:MLR) then represents the two key factors which describe the dynamic behavior of streaming media over packetized networks: packet jitter growth and packet loss. This Index provides at-a-glance determination of traffic impairment as well as an indication of the operating margin of a network. By modifying the calculation of the IFRB, the DF may also be used with variable bit rate streaming media transport over packetized networks.

Figure 3:
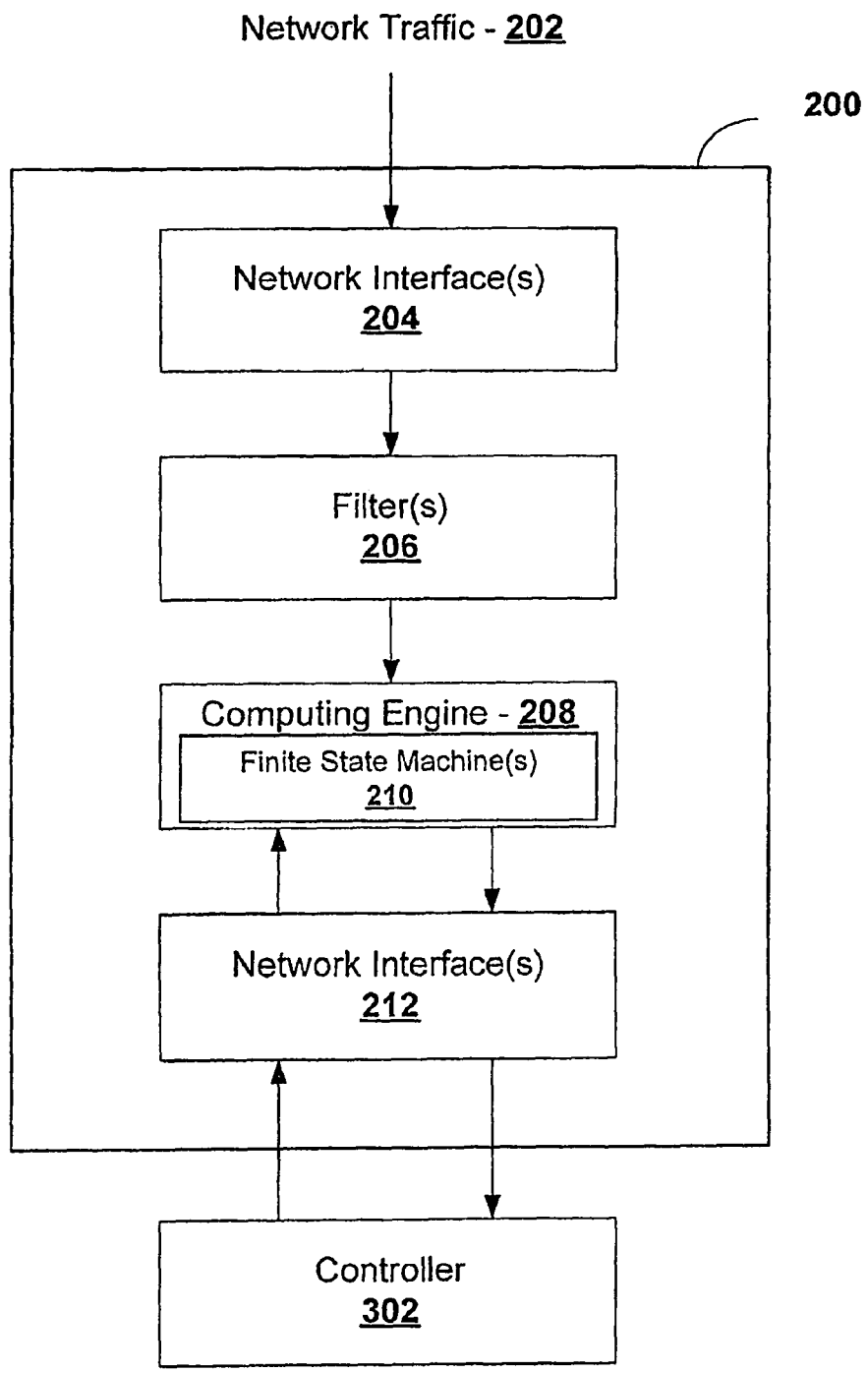
FIG. 3 illustrates an extended embodiment of the present invention wherein a controller is used for controlling the computing element.

FIG. 3 illustrates an extended embodiment of the present invention wherein a controller 302 is used for controlling the computing element 200. Controller 302 transmits, via an interface, control instructions from a management system to modify system-level state-based logic data associated with the computing element 200, and receives, via the interface, the analysis results generated by the computing element 200.

Figure 4:
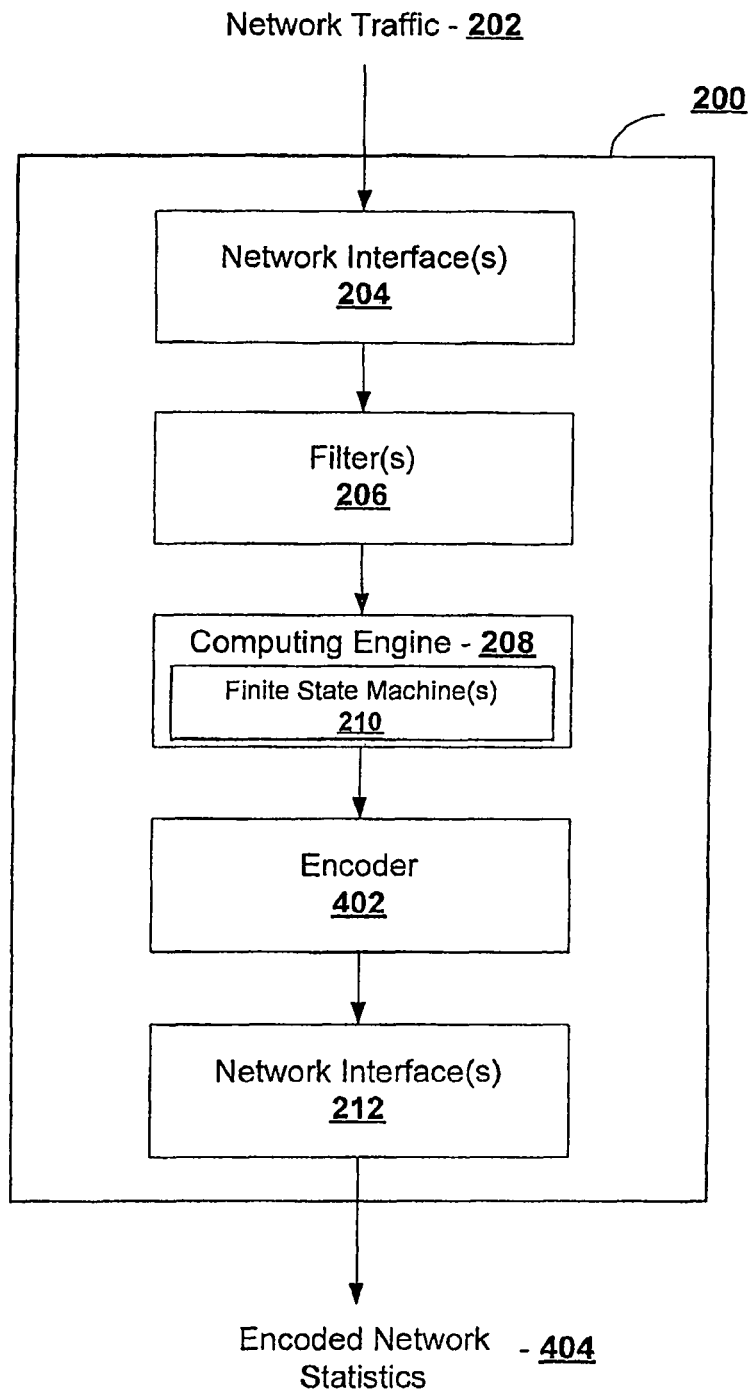
FIG. 4 illustrates another extended embodiment of the present invention wherein an encoder is used to encode the statistics calculated by the computing engine.

FIG. 4 illustrates another extended embodiment of the present invention wherein encoder 402 is used to encode the statistics calculated by computing engine 208. Then, the encoded statistics 404 is transmitted to a measurement consumer via one or more interfaces 212. Some examples of encoding include (but are not limited to) encryption (such as for security), compression, or code format conversion (e.g., convert data in an ASCII format for readability).

Figure 5:
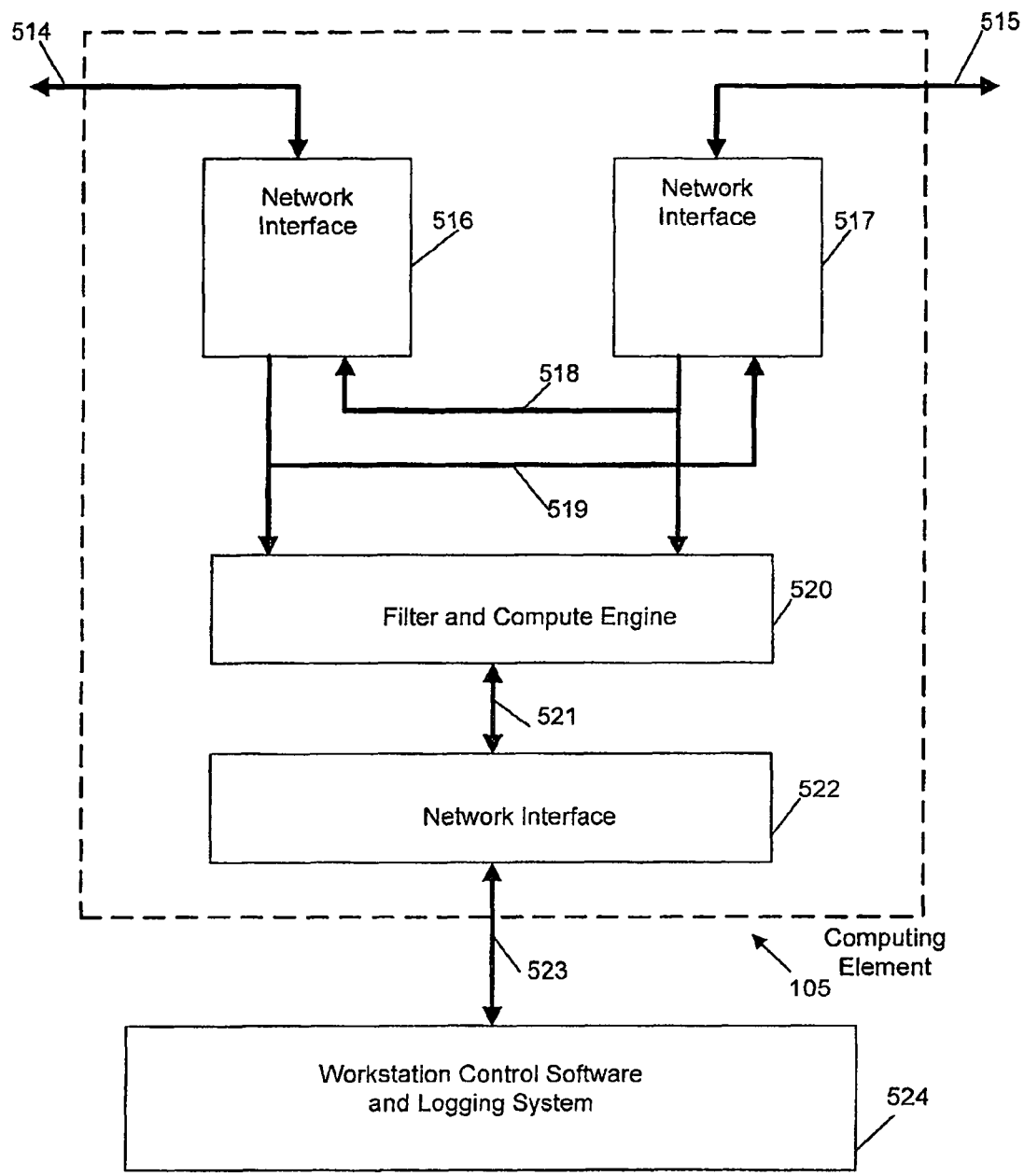
FIG. 5 illustrates an internal block diagram of the computing element and its interconnection with the control and logging system.

It should be noted that more than one network interface can be used to receive network traffic. For example, FIG. 5 illustrates computing element 105 (as used in FIG. 1c) with two network interfaces 516 and 517, wherein computing element 105 is used for analyzing one or more streaming media flows. The two network interfaces 516 and 517 interface with the network link to be monitored via network connections 514 and 515. As in FIG. 2, network link protocols that support such packet-based transmission include, but are not limited to, 802.3 (Ethernet), 802.4, 802.5, USB, ATM, SONET, 802.11, Fibrechannel, Firewire or 1394, Infiniband, Bluetooth, 802.11, 802.15, 802.16, 802.17, ZigBee, or DVB-ASI. In operation, data received from network connection 515 is decoded via network interface 517 and the resulting data is forwarded to the filter and compute engine 520 and to the other network interface 516. Then, network interface 516 forwards the data to the network connection 514, thus completing the connection from network interface 515. Thus, all data received from network interface 515 is forwarded to network interface 514 with a minimum of distortion while making all the same data available for analysis by other components of the computing element. Likewise, all data from network connection 514 is forwarded to network connection 515 while also being forwarded to the filter and compute engine 520. The result is a continuous full duplex connection between network connections 514 and 515 providing an uninterrupted network traffic flow while simultaneously providing all network data to the filter and compute engine 520. Alternatively, as per FIG. 1a and FIG. 1b, the computing element 105 may require only a single network interface, but otherwise performs as described above, with network data being forwarded to the filter and compute engine 520.

The filter and compute engine 520 is configured via interface 521 such that it can filter the desired streaming media flows from other network traffic types for further analysis. For example, to analyze MPEG-2 streaming video over UDP/IP protocols, the filter can be configured to accept only layer-2 packets with the IP protocol type and only IP frames with UDP protocol types and only UDP datagrams that encapsulate MPEG-2 transport streams. After performing the appropriate filtering function, the compute engine calculates the components that comprise the Index value for a given streaming media flow. The Index values, and other statistics regarding the flow, are forwarded to the network interface 522 via interface 521. Then, interface 523 is used to convey the Index values to a measurement consumer such as an application running, for example, in a workstation consisting of control software and a logging system 524, collectively referred to as a "management" system. Network Interface 522 need not be the same type as 516 or 517 (i.e., a RS-232 serial port). Its bandwidth via the choice of physical and link layer protocols may be scaled or sized to match the amount of data expected to be handled. It should be noted that network interface 522, interface 523, and workstation (management system) 524 may be physically co-located with the computing element 105 and need not be external.

Figure 6:
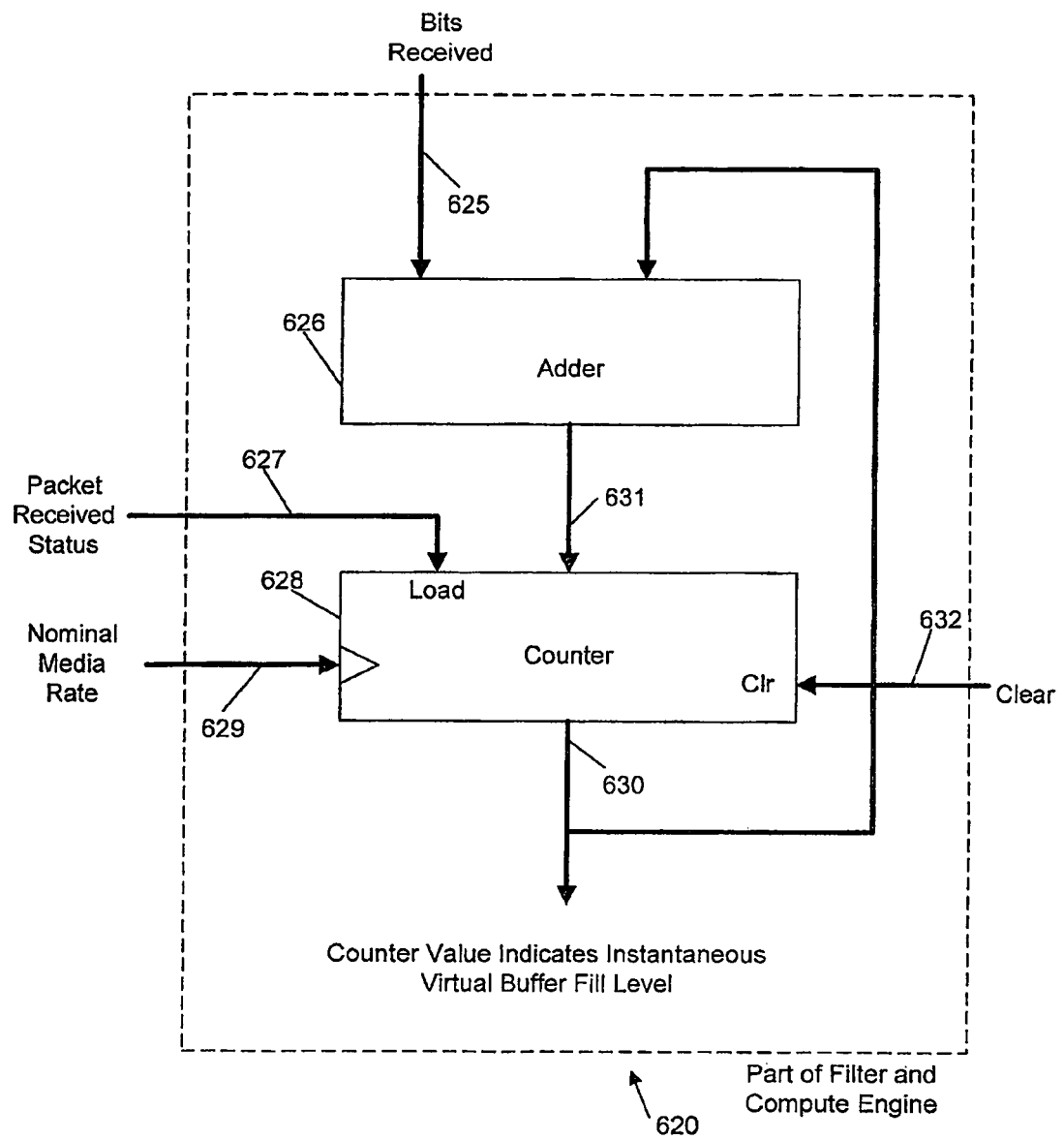
FIG. 6 illustrates an adder and a counter that form a part of the compute engine.

In one embodiment, the compute engine comprises at least one analyzer port 620, such as the finite state machine counter as shown in FIG. 6. The finite state machine counter is used to compute an Instantaneous Flow Rate Balance (IFRB). Counter 628 is loaded when a packet has been received via 627. The counter is loaded with the sum of the current count and the number of bits received in this packet 625 from the adder 626. Counter 628 decrements its count at each clock input pulse 629 whose rate is set to the nominal streaming media rate. Further, counter 628 is cleared at any time via the 632 clear signal. The counter output 630 indicates the number of bits that have been received at the point of test but not yet consumed, assuming that a virtual terminal device which consumes or "uses" the streaming media flow (such as a video decoder for a streaming video media case) drains the data received at a nominal media rate at this network location. Thus, the counter output 630 represents the size of a buffer that would be needed to prevent data loss and absorb the network jitter growth due to data arriving via a packetized network. It should be noted that counter 628 may also result in negative numbers during periods between a burst of data thus representing the size of a virtual terminal's buffer needed to be prefilled to avoid underflow. Adder 626 and counter 628 may also be combined into a single entity to simply track the net difference between bits received on the packetized network side and the bits out based upon an expected drain rate. The actual quantity being tracked may be bits or any derivative thereof (bytes, words, etc.). It is important to note that the bits counted are only those subject to the drain rate. Typically, this is the payload of the packet (i.e., no headers or overhead.) For example, in the case of an MPEG-2 transport stream sent via Ethernet IP/UDP, the bits tracked would typically be the MPEG-2 transport stream packets contained within the Ethernet frame, excluding the IP/UDP headers and Ethernet CRC. The present invention further extends to using streaming media streams that are variable bit rate in nature. Variations in media bit rate may be accommodated by monitoring and updating the expected drain rate used in IFRB calculation along with the stream. Since this finite state machine is simple, it can operate at common media rate speeds and can be replicated easily and compactly if implemented in hardware such as an FPGA, ASIC, or discrete logic, making possible an array of such machines such that one may be dedicated to each streaming media flow. Furthermore, the filter and compute engine can also be configured to capture and track other streaming media flow parameters of interest such as an MPEG-2 transport steam's continuity counters to detect dropped or corrupted packets, stream identifiers, etc.

Returning to the discussion of FIG. 5, streaming media flow parameters as described above can be forwarded via a network Interface 521, and network connection 522, and external network 523, or via any type data interface as they are captured or buffered in a memory in the filter and compute engine for later retrieval by a workstation 524. In some instances, the streaming media content itself may be presented to the workstation 524 via the same path for additional analysis. They may be combined with a time stamp at either the filter and compute engine 520 or the workstation 524. Long term logs may be maintained by 524 for trend analysis, coincident analysis with other network events, the start and end of particular streaming media flows, etc. Alternatively, workstation 524 can show an instantaneous view of streaming media parameters for human monitoring. High and low watermark values may be set in the computing element 105 or in the workstation 524 for the Index parameter or any measured parameter, such that if exceeded, will be logged or trigger an alarm; this functionality may be used to warn of possible impending faults such as deviations from nominal in the flow rates that could cause a network or terminal device buffer to overflow or underflow. The Index value indicates the network's instantaneous operating jitter margin. Additionally, the rate of sampling of such parameters can be reduced to decrease the load on interface 523 during benign network conditions or increased to provide a more detailed analysis of an identified fault. Either the computing element or workstation 524 may produce long term analysis as well by performing additional computational operation on the IFRB.

In some instances, workstation 524 functionality may be integrated with the filter and compute engine for a direct display of information to the user.

It should be noted that a pure hardware, a pure software, and a hybrid hardware/software implementation of the filter and compute engine components is envisioned and should not be used to limit the scope of the present invention.

It should be noted that various kinds of interfaces can be used for establishing a packet-based communication session between the external interfaces (514 or 515 or 523) and the computing element, such as (but not limited to) a gigabit Ethernet network controller or a 10/100 Mbit/s Ethernet network interface card. Moreover, one skilled in the art can envision using various current and future interfaces and, hence, the type of packetized network interface used should not be used to limit the scope for the present invention.

In one embodiment, bandwidth for the transportation of network parameters via interface 523 as discussed above is allocated in an "on-demand" fashion, wherein full channel (network conduit) bandwidth is allocated and available to the measurement consumer. Compute engine 520 can track nearly any set of parameters or events, such as the last N-packets received or statistics acquired, storing it in a circular buffer. Thus, when a critical event occurs such as streaming media data loss, bandwidth would be allocated "on-demand" to report the tracking information leading up to the critical event to the workstation analysis device 524 through the interface 523. Having pertinent information about what traffic the network was handling (not only at the time of the critical event but leading up to it as well) presented "on-demand" at the time of the critical event is very powerful. Having this information greatly reduces the "hunting" time required to identify the cause of the critical event. This information could be gathered remotely as well, given a suitable network type for 523. Expanding on the "on-demand" possibilities for parameter reporting, bandwidth may also be allocated "on-demand" on either network interfaces 514 or 515 in an in-band reporting fashion, facilitating the monitoring by equipment on the same distribution network as the streaming media.

If the network Interface 523 is an ASI (Asynchronous Serial Interface, as in DVB-ASI) type and the streaming media content itself is presented to the Interface in such a way as to minimize instrument timing distortions, a conventional streaming media specific analyzer or monitor may be utilized to not only measure the stream's conformance to expected stream standards but also to indicate the influence of network behavior. In this configuration, the computing element may be thought of as a protocol converter as well.

The present invention's system can be used in debugging various embedded systems within the streaming media's transport network. Various equipment utilized in the transportation or creation of the streaming media may allow debugging and/or parameter manipulation via the transport network as well as provide its own statistical operational information (i.e., its own system "health"). This makes possible the cross-correlation of the system's overall state/health. The invention acquires such control information via a network channel and may use its filter and compute engine capabilities to provide either the raw or processed data to a Workstation Monitor/Logger as described for Index data above.

The present invention allows the implementer the ability to scale the amount of in-band or out-of-band measured or sampled data to pass through the system up to the maximum supported by the network conduit and down to nothing. Additionally, the present invention provides the ability to scale with improvements in network conduit technology. For example, the faster the network conduit, the more measurements or sampled data can pass. Moreover, as high-speed systems continue to evolve, their network conduit's bandwidth is usually increased proportionately to facilitate the use of the high-speed system itself (i.e., a faster network conduit is part of the main feature-set of the system; bandwidth is thereby increased by necessity). The present invention accommodates such increases in bandwidth associated with the network conduit and utilizes such high-speed systems to extract measurements or sampled data at a faster rate.

Figure 7:
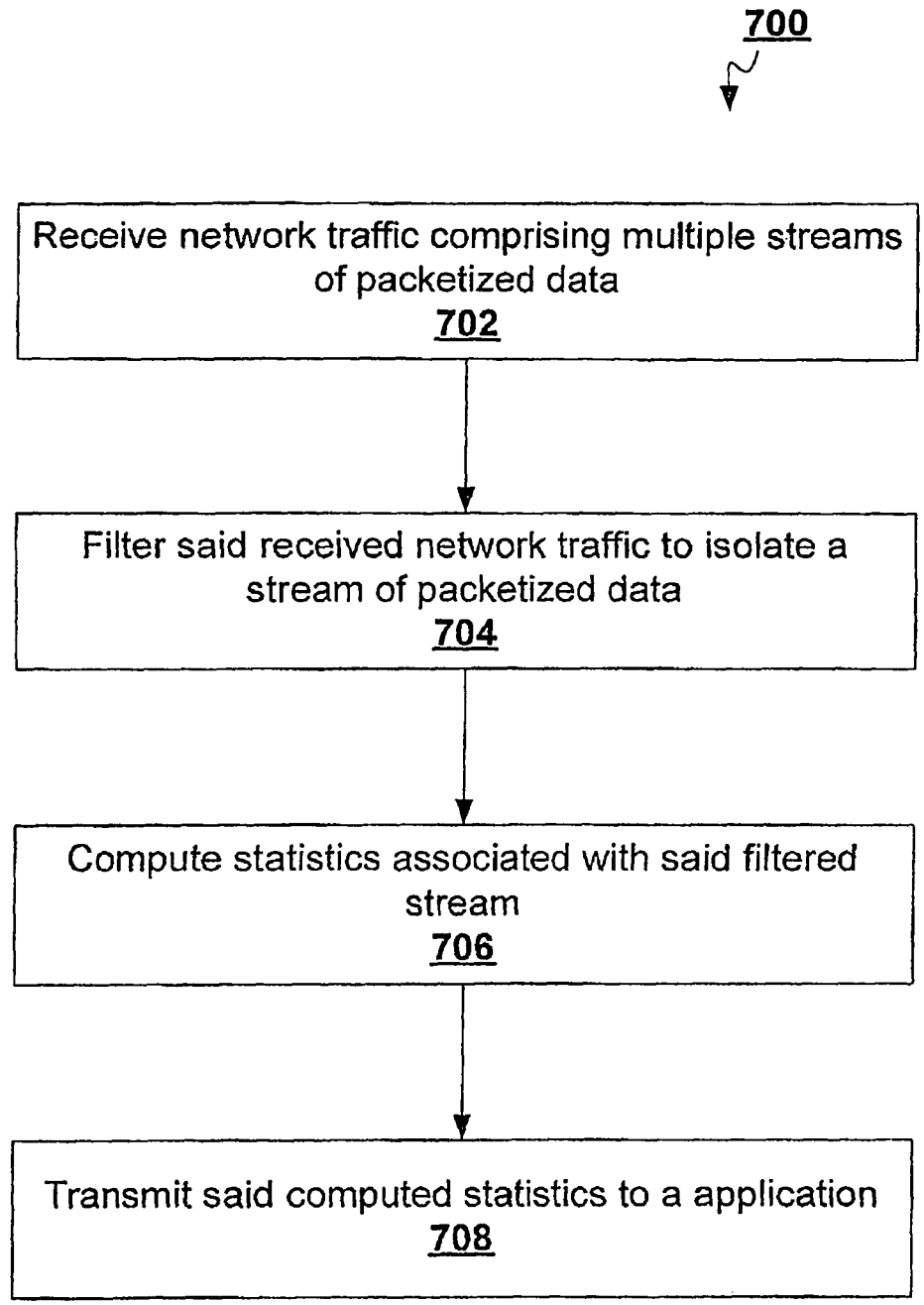
FIG. 7 illustrates a method associated with the present invention.

FIG. 7 illustrates a method 700 associated with an embodiment of the present invention. In step 702, network traffic is received by a network interface, wherein the traffic comprises one or more streams of packetized data. Next, in step 704, the received traffic is filtered to isolate at least one stream of packetized data. In step 706, an Index is computed for the filtered stream of packetized data. In one preferred embodiment, the Index, known as the Media Delivery Index (MDI), consists of two parts: the Delay Factor (DF) and the Media Loss Rate (MLR). The DF represents the Instantaneous Flow Rate Balance (IFRB) and is derived in the computing element as described earlier. The MLR represents the number of lost or corrupted media packets and is readily derived from tracking the Continuity Counter (CC) for the MPEG-2 transport stream application or from a sequence counter or the like for protocols, such as RTP, which support the same. The MDI (DF:MLR) then represents the two key factors which describe the dynamic behavior of streaming media over packetized networks: packet jitter growth and packet loss. This Index provides at-a-glance determination of traffic impairment as well as an indication of the operating margin of a network. Then, in step 708, the computed statistics are forwarded to a measurement consumer, such as one running in a workstation. In one embodiment, a quality of service (QOS) metering scheme is implemented based upon adjusting traffic priority between the forwarded computed network statistics and the streaming network traffic.

Furthermore, the present invention includes a computer program code-based product, which is a storage medium having program code stored therein which can be used to instruct a computer to perform any of the methods associated with the present invention. The computer storage medium includes any of, but not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, and/or any other appropriate static or dynamic memory or data storage devices.

Implemented in computer program code-based products are: (a) receiving network traffic comprising one or more transportation streams; (b) filtering the received traffic and isolating a transportation stream from the transportation streams; (c) computing statistics associated with the isolated transportation stream comprising at least a delay factor (DF) and a media loss rate (MLR), wherein DF defines an instantaneous flow rate balance representing a buffer size that is needed to prevent data loss and absorb network jitter growth, and MLR represents the number of media packets lost or corrupted; and (d) forwarding the computed statistics to a measurement consumer.

In various embodiments, computing element 105, 200, filter 206, and/or filter and compute engine 208, 520, are configured to filter copies of incoming streaming media flow on a packet by packet basis by identifying the destination information thereof. As mentioned hereinabove, in desired embodiments, this may be accomplished using a high speed hardware or combination hardware/software device such as an FPGA. For example, those skilled in the art will recognize that an FPGA (Field Programmable Gate Array) may be easily configured to effectively function as a high speed lookup table or CAM (Content Addressable Memory). Once so configured, incoming packets may be quickly routed to particular gates or ports thereof, shown for example as finite state machine 620 (FIG. 6) simply by matching their destination information to predetermined entries in the lookup table.

Embodiments of the invention may thus utilize nominally any type of destination information that may be associated with packetized media flow. For example, in common protocol layering (OSI 7-Layer Model) and design techniques, packets typically have layer 2 and layer 3 protocol addresses, a layer 4 protocol port number, VLAN ID, etc. Thus, a streaming media flow may be identified by the n-tuple of its layer 2 and 3 address, layer 4 port number, and VLAN ID, etc. Identification of the incoming packets in this manner, and the use of the aforementioned hardware device(s) to filter them, enables these embodiments to simultaneously filter and build a series of isolated media streams nominally in parallel with one another. Moreover, this simultaneous filtering/building may be accomplished substantially at the line rate, e.g., the rate at which the network traffic 202 flows to the network node or computing element 200.

Once the incoming packets have been so filtered into isolated streams, the streams may be analyzed as discussed hereinabove. In addition, various embodiments of the invention may optionally copy and/or redirect one or more of the isolated streams to a monitoring center. This feature enables a user to assess the quality (e.g., visual and/or audio) of a stream as received at a particular network node, from a monitoring center located remotely from the node.

In this regard, computing element 105, 200, and/or filter and compute engine 208, 520 may create a new flow by replicating an incoming flow and dynamically restamping the addressing information thereof, such as by substituting one or more of its' identification parameters (e.g., of the aforementioned n-tuple), with new parameters associated with the address of the monitoring center. The monitoring center will thus receive a derived flow nominally identical in content and quality to that received by computing element 105, 200, etc., for convenient remote monitoring and/or analysis. The original incoming flow may also be processed/analyzed by element 105, 200, etc. in the manner described hereinabove.

As another option, embodiments of the present invention may effect further modifications of the re-directed streams. For example, computing element 105, 200, and/or filter and compute engine 208, 520 may modify the derived streams in a manner that enables a user to quickly identify and/or distinguish among them in the event a plurality of derived streams are received. One such modification includes stamping each stream, e.g., with a unique visible and/or audible identifier.

For example, a user viewing a video on a television or other decoder may see 'stream no. #_' on the screen, such as via a 'closed caption' track added by the computing element/engine. Alternatively, these embodiments may add an audio track which identifies the stream number upon playback. As a further option, engine 104 may simply skew each derived stream timewise, so that a user scanning or 'channel surfing' through the streams will be aware that in fact a different stream is being decoded and viewed, simply by virtue of the fact that a currently viewed stream is running temporally ahead or behind of the previously viewed stream.

With the optional addition of a workstation and workstation control software 524 (FIG. 5) connected to the network/interface 523, dynamic changes and configuration of the computing element, filter or computing engine may be effected. Such changes/configuration may include the specific identifier modifications, such as the particular address and/or port numbers used in the derived streams, and the selection and/or number of network interface(s) 516, 517 that are activated, etc. Those skilled in the art will recognize that multiple network interfaces 516, 517 may be used to conveniently scale to relatively large numbers of data streams.

Moreover, workstation 524 may configure the compute engine to select among multiple real time streams among network traffic 202 received via network interfaces 514, 515, to select initial stream addresses, port numbers, number of streams, or other stream identification or content information. It should be noted that network interfaces 514, 515, and workstation 524 may be physically co-located with the engine 208, 520 and need not be external.

As a further variation of this embodiment, when a stream is redirected to a remote monitoring location, such as to the workstation 524, the computing element 105, 200, filter 206, and/or filter and compute engine 208, 520 may encapsulate and send the re-directed/derived stream using a reliable delivery protocol such as TCP (Transmission Control Protocol). Those skilled in the art will recognize that such a protocol nominally guarantees delivery of data and also ensures that packets will be delivered in the same order in which they were sent. Thus, by using such a delivery protocol, the quality of the backhaul link (i.e., the link between the network node at which the original stream is received, and the monitoring location) may be relatively inferior, without adversely affecting the quality of the monitored stream received at the remote location. In other words, this approach may be used to ensure that the monitored stream accurately reflects the quality received at the network node, by ensuring that any negative network characteristics associated with the backhaul link will not be reflected in the derived stream received at the monitoring location.

In addition, in the event the bandwidth of the remote link cannot support the full bandwidth of the monitored stream, the system (e.g., computing element 105, 200, filter 206, and/or filter and compute engine 208, 520) may optionally encapsulate/re-direct only a subset of the incoming stream of interest. For example, in the case of an incoming video stream, the derived steam may be populated with only the so-called "I" frames of the MPEG encoding process. This may typically reduce the bit rate of a Standard Definition 3.75 Mb/s stream down to around 0.5 Mb/s. While no longer full motion video, this capability still allows a good level of visual confidence monitoring. Furthermore, if the link to the remote site still cannot accommodate the bandwidth of this reduced bit rate stream, then the system may reduce the rate of "I" frames. For example, the system may be configured to send every $2^{nd}$ or every $3^{rd}$, etc. "I" frame. This approach has been tested and found to successfully monitor live streams across highly variable quality internet connections originating across the country.

As a further option, embodiments of the invention may be configured to dynamically extract a single stream from multi-stream feed. For example, a single Program Stream (e.g., corresponding to a single television program) may be dynamically extracted from a conventional Multi Program Transport Stream (MPTS). While a typical MPTS may have a bandwidth of 38 Mb/s requiring a high bandwidth backhaul for monitoring, by extracting a single program, these embodiments may perform the aforementioned remote monitoring function on an individual Program Stream with a much reduced backhaul bandwidth requirement. In this manner, this embodiment includes monitoring equipment capable of extracting and retransmitting program streams from an MPTS.

A pure hardware, a pure software, and a hybrid hardware/software implementation of the various components of these embodiments is envisioned. In addition, various kinds of interfaces may be used for establishing a packet-based communication session between these various components, such as (but not limited to) a gigabit Ethernet network controller or a 10/100 Mbit/s Ethernet network interface card. Moreover, one skilled in the art can envision using various current and future interfaces and, hence, the type of packetized network interface used should not be used to limit the scope of the present invention.

The present invention allows the implementer the ability to conveniently scale the amount of stream data simultaneously analyzed up to the maximum supported by the network conduit, i.e., at a particular network node, and down to nothing. Additionally, the present invention provides the ability to scale with improvements in network conduit technology. For example, the faster the network conduit, the more streams that can be analyzed and/or dynamically re-directed for analysis.

Furthermore, embodiments of the present invention include computer program code based products, which may include a storage medium having program code stored therein which can be used to instruct a computer to perform any of the methods associated with the present invention. The computer storage medium includes any of, but not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, and/or any other appropriate static or dynamic memory or data storage devices.

Moreover, although embodiments of the present invention have been shown and described as stand-alone modules connectable to a data stream, embodiments of the invention may also be co-located with nominally any network component. For example, embodiments may include hardware, software, and/or hybrid hardware/software components disposed within otherwise conventional network devices or nodes, such as IP switches, routers, servers, VoD servers, VoIP servers, PCs, blades, DSLAMs (Digital Subscriber Line Access Multiplexer), Set Top Boxes (e.g., for CATV), IP Phones, streaming test Generators, streaming sources such as MPEG or other stream compression encoders, stream multiplexers, etc.

CONCLUSION

A system and method has been shown in the above embodiments for the effective implementation of a system and method for measuring and exposing the dynamic behavior of streaming media over a packet-based network. While various preferred embodiments have been shown and described, it will be understood that there is no intent to limit the invention by such disclosure but, rather, it is intended to cover all modifications and alternate constructions falling within the spirit and scope of the invention as defined in the appended claims. For example, the present invention should not be limited by the number of network interfaces, number of filters, number of streams handled by the compute engine, type of packetized network conduit, location of control software, choice of hardware or software implementation of bandwidth provisioning or filter or compute engine, type of streaming media data, choice of hardware or software implementation of the "on-demand" embodiment, computing environment, or specific hardware associated with the network interfaces, filter device, or compute engine system.

The above systems are implemented in various computing environments. For example, the present invention may be implemented on a conventional IBM PC or equivalent, multi-nodal system (e.g., LAN) or networking system (e.g., Internet, WWW, wireless web). All programming and data related thereto are stored in computer memory, static or dynamic or non-volatile, and may be retrieved by the user in any of: conventional computer storage, display (i.e., CRT) and/or hardcopy (i.e., printed) formats. The programming of the present invention may be implemented by one skilled in the art of computer systems and/or software design.

Having thus described the invention, what is claimed is:

1. A method for simultaneously analyzing multiple packetized media streams in a network, said method comprising:
   receiving network traffic corresponding to a plurality of media streams at a node of the network, said network traffic including packets having destination information and a media payload;
   filtering said network traffic into said plurality of media streams on a packet-by-packet basis, based upon said destination information;
   passing the media payload of each packet of each of the plurality of media streams excluding, at least, a header of each said packet, to one of a plurality of hardware-implemented analyzer ports respectively associated with each destination;
   building a plurality of isolated media streams in parallel with one another, based, at least in part, upon the passed media payload of each said packet that excludes, at least, the header of each said packet, wherein each of the plurality of isolated media streams includes only one stream of packetized data;
   effecting said filtering and passing simultaneously at the rate said network traffic passes through the node;
   computing statistics associated with each of the plurality of isolated media streams, wherein said statistics comprise at least a delay factor (DF) parameter and a media loss rate (MLR) parameter; and
   replacing the destination information of at least one of the plurality of isolated media streams with new destination information.

2. The method of claim 1, wherein said received network traffic comprises a copy of network traffic passing through the node.

3. The method of claim 1, comprising removing the destination information from each packet prior to said passing.

4. The method of claim 1, wherein the hardware-implemented analyzer ports are disposed within hardware selected from a group consisting of an FPGA, ASIC, discrete logic, and combinations thereof.

5. The method of claim 4, wherein the hardware-implemented analyzer ports comprise a hardware-implemented lookup table.

6. The method of claim 4, wherein the hardware-implemented lookup table comprises a content addressable memory (CAM).

7. The method of claim 4, wherein the hardware-implemented analyzer ports comprise an array of finite state machines.

8. The method of claim 1, further comprising modifying the media payload of the at least one of the plurality of isolated media streams to correspond to the new destination information thereof, to facilitate identification of decoded versions thereof.

9. The method of claim 8, wherein said modifying comprises modifying the media payload by applying a stamp selected from the group consisting of a visual signal and an audible signal.

10. The method of claim 8, wherein said modifying comprises temporally offsetting the at least one of the plurality of isolated media streams from one another.

11. The method of claim 1, wherein said computing is effected at the new destination.

12. The method of claim 1, wherein the destination information comprises an IP Protocol n-tuple.

13. The method of claim 12, wherein the n-tuple comprises at least one of an OSI layer 2 address, layer 3 address, layer 4 port number, and VLAN ID.

14. The method of claim 1, wherein the plurality of media streams are of distinct media formats.

15. The method of claim 1, wherein the plurality of media streams are selected from the group consisting of constant bit rate and variable bit rate streams.

16. The method of claim 1, wherein said computing comprises analyzing the network's influence on at least one of the plurality of isolated media streams.

17. The method of claim 1, further comprising:
   computing statistics associated with each of the plurality of isolated media streams, said statistics comprising at least a delay factor (DF) parameter defining an instantaneous flow rate balance representing a virtual buffer delay that is needed to prevent data loss and absorb network jitter growth; and
   forwarding, for each of the plurality of isolated streams, said computed statistics to a measurement consumer.

18. The method of claim 17, wherein said computed statistics comprise a media loss rate (MLR) parameter representing a number of media packets lost or corrupted.

19. The method of claim 1, wherein said computed statistics comprise any of the following: stream instantaneous bit-rate, average bit-rate, deviation from nominal bit-rate, minimum and maximum deviation from nominal bit-rate, instantaneous flow rate, minimum and maximum instantaneous flow rate, instantaneous flow rate deviation, minimum and maximum instantaneous flow rate deviation, stream utilization of network bandwidth, minimum and maximum of stream utilization of network bandwidth, or number of sequence errors.

20. The method of claim 17, wherein said instantaneous flow rate balance value is computed from said each of the plurality of isolated media streams via a counter computing an instantaneous flow rate and said counter registers a deviation from nominal as an indication of the flow's instantaneous accumulated jitter for forwarding to said measurement consumer.

21. A non-transitory computer readable medium including a computer program product residing thereon having a plurality of instructions stored thereon which, when executed by a processor, cause the processor to perform operations comprising:

receiving network traffic corresponding to a plurality of media streams at a node of the network, said network traffic including packets having destination information and a media payload;

filtering said received network traffic into said plurality of media streams on a packet-by-packet basis, based upon said destination information;

passing the media payload of each packet of each of the plurality of media streams excluding, at least, a header of each said packet, to one of a plurality of hardware-implemented analyzer ports respectively associated with each destination;

building a plurality of isolated media streams in parallel with one another, based, at least in part, upon the passed media payload of each said packet that excludes, at least, the header of each said packet, wherein each of the plurality of isolated media streams includes only one stream of packetized data;

computing statistics associated with each of the plurality of isolated media streams, wherein said statistics comprise at least a delay factor (DF) parameter and a media loss rate (MLR) parameter; and replacing the destination information of at least one of the plurality of isolated media streams with new destination information.

22. The computer program product of claim 21, wherein the statistics include at least a delay factor (DF) parameter defining an instantaneous flow rate balance representing a virtual buffer delay that is needed to prevent data loss and absorb network jitter growth.

23. The computer program product of claim 22, wherein the statistics further include a media loss rate (MLR) parameter representing number of media packets lost or corrupted.

24. A system for simultaneously analyzing multiple packetized media streams in a network at a network node, the system comprising:

one or more interfaces configured to forward a copy of the multiple packetized media streams, the streams including packets having destination information and a media payload;

one or more filters configured to receive and filter said forwarded media streams on a packet by packet basis based upon said destination information;

a plurality of hardware-implemented analyzer ports respectively associated with each destination, configured to receive the media payload of each filtered packet of each of the forwarded media streams excluding, at least, a header of each said filtered packet;

the plurality of hardware-implemented analyzer ports being further configured to build a plurality of isolated media streams in parallel with one another, based, at least in part, upon the received media payload of each said filtered packet that excludes, at least, the header of each said filtered packet, wherein each of the plurality of isolated media streams includes only one stream of packetized data;

a computing engine configured to compute statistics associated with each of the plurality of isolated media streams, wherein said statistics comprise at least a delay factor (DF) parameter and a media loss rate (MLR) parameter; and wherein said computing engine is configured to replace the destination information of at least one of the plurality of isolated media streams with new destination information.

25. The system of claim 24, wherein the hardware-implemented analyzer ports are disposed within hardware selected from a group consisting of an FPGA, ASIC, discrete logic, and combinations thereof.

26. The system of claim 24, wherein the hardware-implemented analyzer ports comprise a hardware-implemented lookup table.

27. The system of claim 26, wherein the hardware-implemented lookup table comprises a content addressable memory (CAM).

28. The system of claim 24, wherein the hardware-implemented analyzer ports comprise an array of finite state machines.

29. The system of claim 24, wherein said computing engine is configured to modify the media payload of the at least one isolated media streams to correspond to the new destination information thereof, to facilitate identification of decoded versions thereof.

30. The system of claim 29, wherein said computing engine is configured to modify the media payload by applying a stamp selected from the group consisting of a visual signal and an audible signal.

31. The system of claim 29, wherein said computing engine is configured to temporally offset the at least one of the plurality of isolated media streams from one another.

32. The system of claim 24, wherein said computing engine is configured to encapsulate at least a portion of at least one of the plurality of isolated media streams within a reliable delivery protocol encoded with new destination information.

33. The system of claim 32, wherein said computing engine is configured to encapsulate a subset of the at least one of the plurality of isolated media streams, wherein bandwidth requirements of a link to the new destination are reduced.

34. The system of claim 32, wherein said at least one of the plurality of isolated media streams comprises a single program stream extracted from a Multi Program Transport Stream (MPTS).

35. The system of claim 24, wherein the destination information comprises an Internet Protocol n-tuple.

36. The system of claim 35, wherein the n-tuple comprises at least one of an OSI layer 2 address, layer 3 address, layer 4 port number, and VLAN ID.

37. The system of claim 24, wherein the media streams are of distinct media formats.

38. The method of claim 24, wherein the media streams are selected from the group consisting of constant bit rate and variable bit rate streams.

39. The system of claim 24, wherein said computing engine is configured to analyze the network's influence on each of the plurality of isolated media streams.

40. The system of claim 24, wherein said one or more filters and said plurality of hardware-implemented analyzer ports are configured to build the plurality of isolated media streams substantially at the rate said network traffic passes through the node.

41. The system of claim 24, wherein said computing engine is configured to compute statistics comprising at least a delay factor (DF) defining an instantaneous flow rate balance representing a virtual buffer delay that is needed to prevent data loss and absorb network jitter growth.

42. The system of claim 41, wherein said computed statistics comprise a media loss rate (MLR) parameter, said MLR representing number of media packets lost or corrupted.

43. The system of claim 41, comprising one or more interfaces configured to forward said computed statistics to a measurement consumer.

44. The system of claim 43, wherein said computing engine comprises one or more finite state machines to compute index values associated with said one or more streams of interest, said index values for each stream comprising at least a delay factor (DF) and a media loss rate (MLR), said DF defining an instantaneous flow rate balance representing a virtual buffer delay that is needed to prevent data loss and absorb network jitter growth for said stream, and said MLR representing number of media packets lost or corrupted for said stream.

45. The system of claim 44, comprising a controller to transmit control instructions from said measurement consumer to modify system-level state-based logic data associated with said one or more finite state machines.

46. The system of claim 44, wherein at least one of said interfaces is a native streaming video interface configured to forward a streaming media payload, said native streaming video interface providing minimum time distortion to permit media stream analysis and monitoring by a native streaming media analyzer.

* * * * *